(12) United States Patent
Ohwa et al.

(10) Patent No.: US 10,460,291 B2
(45) Date of Patent: Oct. 29, 2019

(54) INFORMATION PROCESSING APPARATUS, INFORMATION PROCESSING METHOD, AND COMPUTER PROGRAM FOR SCHEDULING ACTIVITIES MODELLED FROM ACTIVITIES OF THIRD PARTIES

(75) Inventors: Tsunayuki Ohwa, Kanagawa (JP); Miruka Ishii, Tokyo (JP); Miwa Ichikawa, Tokyo (JP); Ritsuko Kano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 280 days.

(21) Appl. No.: 13/609,760

(22) Filed: Sep. 11, 2012

(65) Prior Publication Data
US 2013/0097547 A1    Apr. 18, 2013

(30) Foreign Application Priority Data
Oct. 13, 2011    (JP) ................... 2011-225942

(51) Int. Cl.
*G06Q 10/10*    (2012.01)
*A63B 24/00*    (2006.01)

(52) U.S. Cl.
CPC ....... *G06Q 10/109* (2013.01); *A63B 24/0062* (2013.01); *A63B 24/0075* (2013.01); *A63B 24/0084* (2013.01); *A63B 2024/0068* (2013.01); *A63B 2024/0081* (2013.01)

(58) Field of Classification Search
CPC .... A63B 2024/0065; A63B 2024/0068; A63B 2024/0071; A63B 2024/0078; A63B 2024/0081; A63B 24/0062; A63B 24/0075; A63B 24/0084; G06Q 10/109

USPC .................................................. 715/700–866
See application file for complete search history.

(56) References Cited

U.S. PATENT DOCUMENTS

| | | | |
|---|---|---|---|
| 5,890,997 A * | 4/1999 | Roth ................................ 482/8 |
| 2002/0004734 A1 | 1/2002 | Nishizawa | |
| 2002/0072655 A1* | 6/2002 | Pfeffer ................... A63B 22/00 600/300 |
| 2003/0224337 A1* | 12/2003 | Shum ..................... G09B 19/00 434/247 |
| 2006/0183602 A1* | 8/2006 | Astilean ............................ 482/7 |
| 2006/0223674 A1* | 10/2006 | Korkie ............................. 482/8 |
| 2007/0117074 A1* | 5/2007 | Maurides et al. ............ 434/247 |
| 2007/0198535 A1* | 8/2007 | Oliver ...................... G09B 7/02 |

(Continued)

FOREIGN PATENT DOCUMENTS

| CN | 101713660 A | 5/2010 |
|---|---|---|
| JP | 2004-198158 | 7/2004 |

(Continued)

OTHER PUBLICATIONS

Jun. 30, 2015, Japanese Office Action for related JP application No. 2011-225942.

(Continued)

*Primary Examiner* — Daniel Samwel
(74) *Attorney, Agent, or Firm* — Paratus Law Group, PLLC

(57) ABSTRACT

Provided is an information processing apparatus including a presentation section which presents an action log that is an action result of a third party, and a schedule adjustment section which incorporates the action log selected from the presented action log by a user as a schedule of schedule information of the user.

18 Claims, 18 Drawing Sheets

(56) References Cited

U.S. PATENT DOCUMENTS

| | | | |
|---|---|---|---|
| 2008/0171636 A1* | 7/2008 | Usui et al. .................. | 482/8 |
| 2009/0233771 A1* | 9/2009 | Quatrochi .......... | A63B 24/0021 |
| | | | 482/9 |
| 2010/0036652 A1* | 2/2010 | Kim ................... | A63B 24/0021 |
| | | | 703/11 |
| 2010/0057235 A1* | 3/2010 | Wang .................. | G06F 1/1626 |
| | | | 700/94 |
| 2010/0088023 A1* | 4/2010 | Werner ..................... | 701/206 |
| 2010/0204016 A1* | 8/2010 | Chiu et al. .................. | 482/9 |
| 2010/0274576 A1* | 10/2010 | Young .................. | G06F 19/322 |
| | | | 705/2 |
| 2011/0098928 A1* | 4/2011 | Hoffman ............ | A63B 24/0062 |
| | | | 702/5 |
| 2011/0145428 A1* | 6/2011 | Wei ..................... | G06F 3/0481 |
| | | | 709/231 |
| 2012/0253484 A1* | 10/2012 | Burich ................ | G06F 19/3418 |
| | | | 700/91 |
| 2013/0040272 A1* | 2/2013 | Booher ..................... | 434/254 |
| 2013/0143188 A1* | 6/2013 | Hong ................ | G09B 19/0038 |
| | | | 434/247 |
| 2013/0157786 A1* | 6/2013 | Joseph et al. ................. | 473/436 |

FOREIGN PATENT DOCUMENTS

| | | | | |
|---|---|---|---|---|
| JP | 2008-003655 | 1/2008 | | |
| WO | WO 2008/126257 A1 | 10/2008 | | |
| WO | WO-2012023644 A1 * | 2/2012 | ......... | G09B 19/0038 |

OTHER PUBLICATIONS

Jul. 14, 2016, Chinese Office Action for related CN application No. 201210370315.6.

\* cited by examiner

FIG. 1
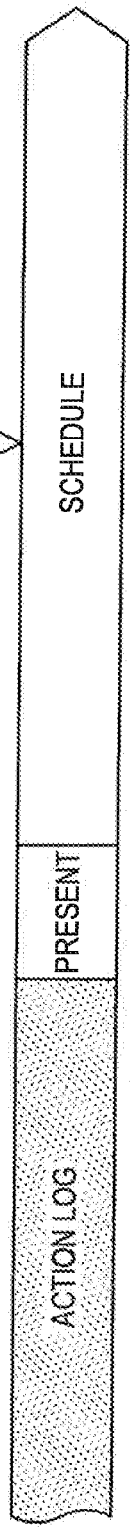
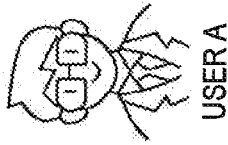

FIG.5

| When | | Who | | What | Where | Why | How |
|---|---|---|---|---|---|---|---|
| START TIME | END TIME | USER | MAIN PEOPLE IN ATTENDANCE | CATEGORY | DISTANCE/LOCATION | TARGET/PURPOSE | METHOD |
| 4/16 | | USER X | | JOGGING | 4km | 10km | BGM |
| 4/22 | | USER Y | | JOGGING | 4km | 2km | SPEED |
| 4/24 18:00 | 4/24 22:00 | USER X | A, B, C | PARTY | YOKOHAMA | ALUMNI ASSOCIATION | PARTICIPATE |
| 4/17 15:00 | 4/17 17:00 | USER X | A, B, C | TENNIS | TENNIS COURT | PRACTICE | PARTICIPATE |

INFORMATION PROCESSING APPARATUS, INFORMATION PROCESSING METHOD, AND COMPUTER PROGRAM FOR SCHEDULING ACTIVITIES MODELLED FROM ACTIVITIES OF THIRD PARTIES

BACKGROUND

The present disclosure relates to an information processing apparatus, an information processing method, and a computer program.

Technology which recognizes operation actions of a user from sensor information acquired using various sensing technologies has been proposed in JP 2008-3655A. The recognized operation actions of the user are automatically recorded as an action log, and can be expressed with various techniques, such as reproduction with an animation such as an avatar, showing a movement locus of the user on a map, or expressing various action operations using abstracted indicators.

SUMMARY

In the related art, an action log is treated as past data, and a feature amount obtained by analyzing the action log is used for present or future actions. For example, in a system which provides content, the preferences of a user are analyzed from the content provided to the user in the past, and in the case where the content meets the preferences of the user, based on an analytical result at the time when the content is subsequently provided to the user, the content is used. The use of such an action log is linked to the generation of a new value, where further use is anticipated.

According to an embodiment of the present disclosure, there is provided an information processing apparatus, including a presentation section which presents an action log that is an action result of a third party, and a schedule adjustment section which incorporates the action log selected from the presented action log by a user as a schedule of schedule information of the user.

In addition, according to an embodiment of the present disclosure, there is provided an information processing method, including presenting an action log that is an action result of a third party, and incorporating the action log selected from the presented action log by a user as a schedule of schedule information of the user.

Further, according to an embodiment of the present disclosure, there is provided a computer program for causing a computer to function as an information processing apparatus including a presentation section which presents an action log that is an action result of a third party, and a schedule adjustment section which incorporates the action log selected from the presented action log by a user as a schedule of schedule information of the user.

According to the embodiments of the present disclosure described above, by using an action log of a third party as a schedule of schedule information of the user, the user can recognize an effect from the action result of this third party, and can use this effect to achieve a target action set by the user themselves.

BRIEF DESCRIPTION OF THE DRAWINGS

FIG. 1 is an explanatory diagram describing an outline of a schedule creation function using an action log by a lifestyle coordinator according to an embodiment of the present disclosure;

FIG. 5 is an explanatory diagram showing a format example of an action log;

DETAILED DESCRIPTION OF THE EMBODIMENT(S)

Figure 2:
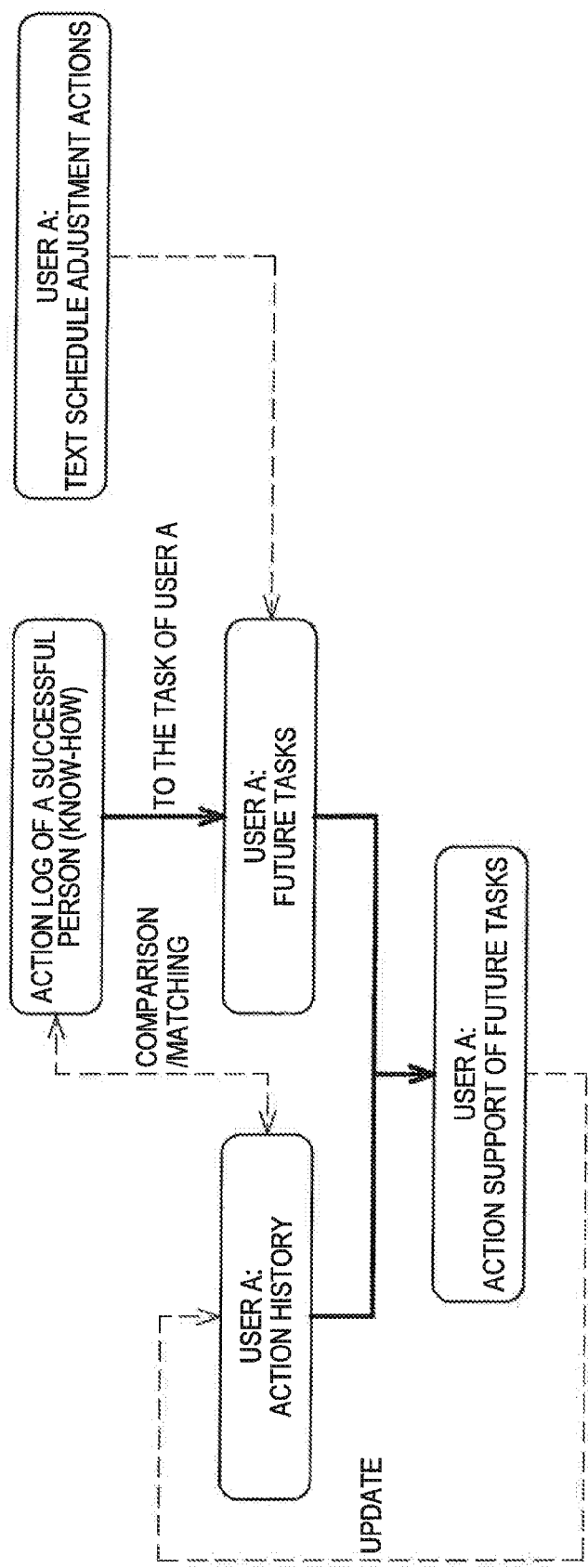
FIG. 2 is a flow chart showing an outline of a schedule creation process using an action log according to the present embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Outline of a schedule creation function using an action log
2. Configuration of an information processing system
2-1 Outline configuration of the information processing system
2-2 Functional configuration of the information processing system
3. Schedule creation function using an action log
3-1 Schedule creation process using an action log by an information processing system
3-2 Communications display
4. Hardware configuration example <1. Outline of a Schedule Creation Function Using an Action Log>

First, based on FIGS. 1 and 2, an outline of a schedule creation function using an action log by a lifestyle coordinator according to an embodiment of the present disclosure will be described. FIG. 1 is an explanatory diagram describing an outline of a schedule creation function using an action log by a lifestyle coordinator according to the present embodiment. FIG. 2 is a flow chart showing an outline of a schedule creation process using an action log.

An information processing system, which incorporates an action log of a third party into schedule information of a user, is called a lifestyle coordinator and is described in the present embodiment. The lifestyle coordinator cooperates with an action log that is information relating to the past and with a schedule that is future information, and has a function which incorporates the action log into a schedule of the user. While the action log is information relating to the past, the action log was previously future information for the schedule. That is, when a schedule of an elapsed time is implemented, the schedule becomes an action log. The purpose of the lifestyle coordinator is to generate values connecting past information with future information, based on the relevance between such an action log and schedule.

Hereinafter, as an example, a schedule creation function using an action log, in which an action log of a third party targeted by the user up until a target is reached is incorporated into the schedule of the user as a schedule by a lifestyle coordinator, will be described. The action log of the third party targeted by the user is called a successful experience log, and can be used as valuable information which approaches the path of the targeted third party, by acting on a reference by the user.

As shown in FIG. 1, for example, when considering an action of a user A, it is assumed that the present is the starting point, past action information is the action log, and future action information is the schedule. Here, when an action (target action) targeted by user A is determined, the user A uses the lifestyle coordinator, and sets a schedule for achieving the target action based on the action log of a third party, who is a successful person who has achieved the same target action.

That is, when the user A sets the target action, as shown in FIG. 2, the lifestyle coordinator sets a future task (schedule) of the user A by assuming that the action log of the successful person is the know-how of the successful person. In this case, the lifestyle coordinator presents an action log of the successful person suitable for the achievement level, lifestyle, or the like of the user A while comparing with the action history (action log) of the user A, and supports the actions of future tasks of the user A. Further, the lifestyle coordinator may include a function which incorporates an automatic schedule (text schedule) into the schedule of the user A, by extracting keywords such as [time] or [location] from text information such as mail.

Hereinafter, a configuration example of an information processing system (lifestyle coordinator) which incorporates an action log of a third party into schedule information of the user according to the present embodiment will be described in detail.

<2. Configuration of an Information Processing System>

Figure 3:
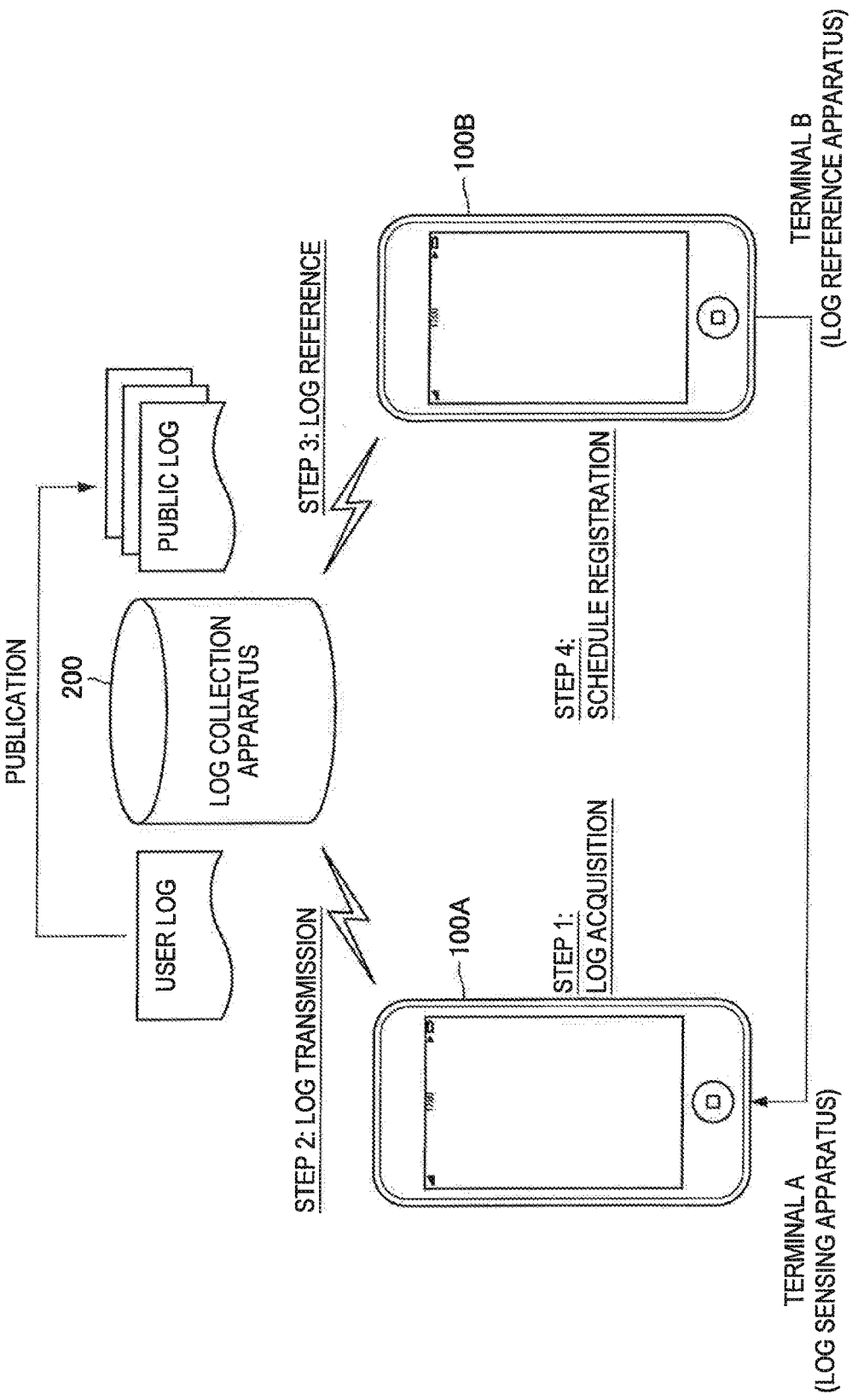
FIG. 3 is an explanatory diagram showing an outline configuration of an information processing system according to the present embodiment.
Figure 4:
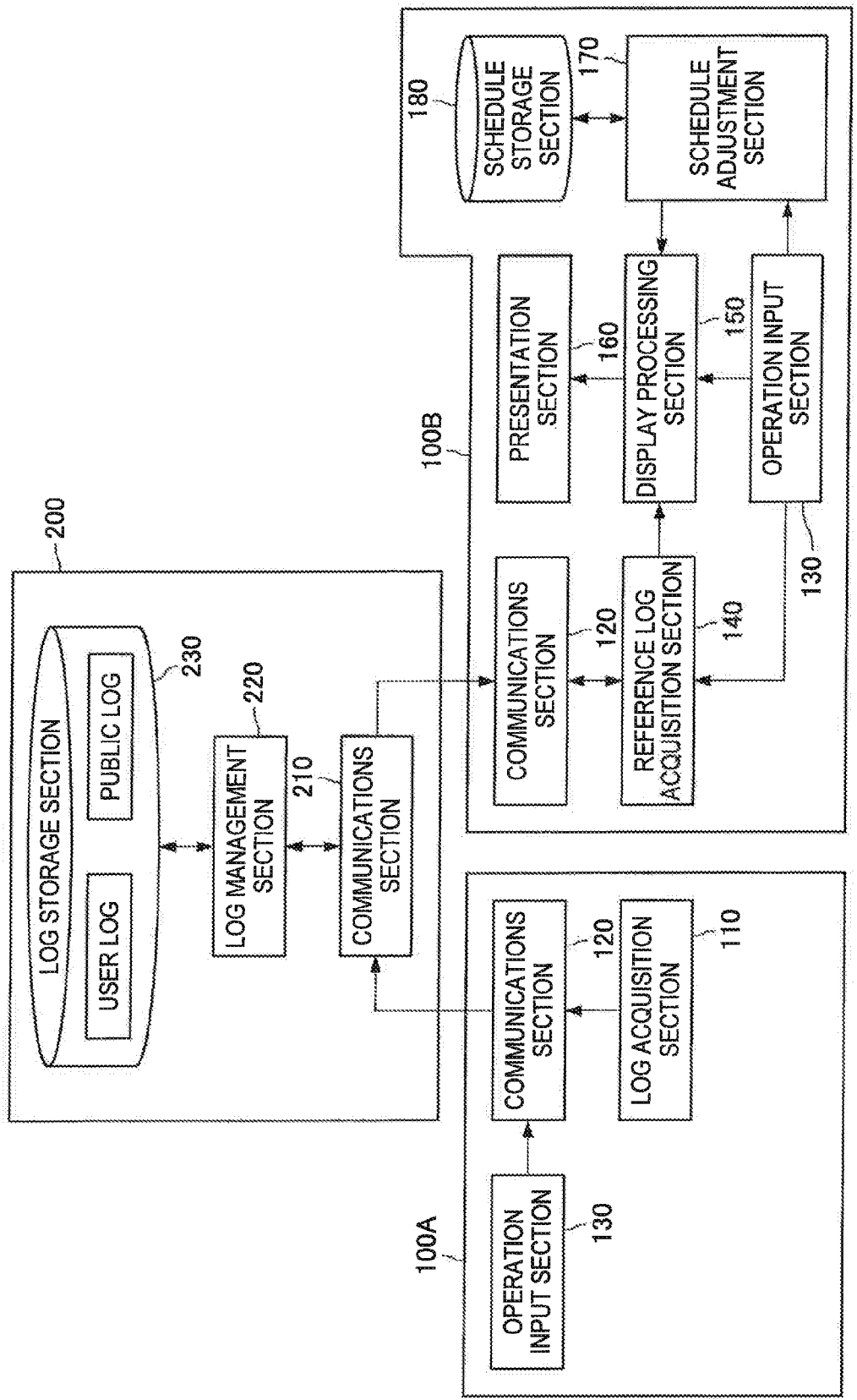
FIG. 4 is a functional block diagram showing a configuration of an information processing system according to the present embodiment.

A configuration of the information processing system based on FIGS. 3 to 5 will be described. FIG. 3 is an explanatory diagram showing an outline configuration of the information processing system according to the present embodiment. FIG. 4 is a functional block diagram showing a configuration of the information processing system according to the present embodiment. FIG. 5 is an explanatory diagram showing a format example of an action log.

[2-1 Outline Configuration of the Information Processing System]

As shown in FIG. 3, the information processing system according to the present embodiment includes an information processing terminal 100, which is held and operated by a user, and a log collection apparatus 200 which collects an action log of a user obtained by the information processing terminal 100.

The information processing terminal 100 is a portable information terminal such as a smart phone, a tablet terminal, or the like. A sensor and application, which acquire an action history, operation history, or the like, of a user who uses this terminal as an action log are provided in the information processing terminal 100. Further, the information processing terminal 100 includes an application for referring to the action log, a display (display section), and an application for registering a schedule in the schedule information. As described above in FIG. 3, an information processing terminal, which transmits to the log collecting apparatus 200 by acquiring an action log, is assumed to be a terminal A (log sensing apparatus: 100A), and an information processing terminal, which refers to the an action log collected by the log collecting apparatus 200, is assumed to be a terminal B (log reference apparatus: 100B). Note that terminals 100A and 100B can be assumed to be terminals which have a similar configuration and function, and the information processing terminal 100 can function as either a log sensing apparatus which acquires an action log, or a log reference apparatus which refers to the action log.

The log collection apparatus 200 is an apparatus which collects and manages an action log acquired by the information processing terminal 100. The action log acquired by the information processing terminal 100 is transmitted to the log collection apparatus 200 through a network. The log collection apparatus 200 stores the action log as a user log of the user who uses the information processing terminal 100. Further, the log collection apparatus 200 provides a public log, which is publically open to other people, from within the user log stored in accordance with a request from the information processing terminal 100.

In such an information processing system, first an action log is acquired by the information processing terminal 100 (step 1: log acquisition). The acquisition of the action log is continuously performed. The action log is history information of content actually acted by the user, and, for example, is created from time information, position information, or the like, acquired by action results input by the user and a sensor provided in the information processing terminal 100. Note that while it will be described later, in the present embodiment the action log is represented and managed in the form of 5W1H of When, Who, What, Where, Why and How.

The acquired action log is transmitted to the log collection apparatus 200 at a prescribed timing (step 2: log transmission). The log collection apparatus 200 manages the received action log as a user log for each user. The action log managed as a user log receives publication instructions for this user, and publicly opens the action log to other people as a public log.

In the information processing system according to the present embodiment, the public log collected in the log collection apparatus 200 can be referred to, when the user records a schedule in the schedule information (step 3: log reference). The user refers to a public log of a third party who has achieved a target action similar to a target action set by the user themselves, and knows what actions are to be taken until the target action will be achieved. Then, when the user selects the public log considered to be suitable for the user themselves from an achievement level, lifestyle habit, or the like, an action result of the selected public log is registered in the schedule information as a schedule of the user (step 4: schedule registration).

[2-2. Functional Configuration of the Information Processing System]

FIG. 4 shows more specifically the functional configuration of the information processing system according to the present embodiment. That is, while the information processing terminal 100A is described above as providing only an acquisition function of the action log, and the information processing terminal 100B is described above as providing only a function of schedule registration for a reference and schedule information of the action log, either of the terminals 100A and 100B may be provided with each of these functions.

(Information Processing Terminal)

The information processing terminal 100 includes a log acquisition section 110, a communications section 120, an operation input section 130, a reference log acquisition section 140, a display processing section 150, a presentation section 160, a schedule adjustment section 170, and a schedule storage section 180. When viewing different functions, the information processing terminal 100A, which functions as a log sensing apparatus, includes the log acquisition section 110, the communications section 120, and the operation input section 130, as shown in FIG. 4.

The log acquisition section 110 acquires history information of content actually acted by the user as the action log. The log acquisition section 110, for example, is a processing section which acquires and processes action results input by the user from the operation input section 130, and various sensors, which acquire such things as time information and position information, included in the information processing terminal 100. The log acquisition section 110 outputs the acquired action log to the communications section 120.

The communications section 120 is an interface which communicates with the log collection apparatus 200 through a network. The communications section 120 transmits the action log acquired by the log acquisition section 110 to the log collection apparatus 200, and transmits publication instructions of the action log input from the operation input section 130 to the log collection apparatus 200.

The operation input section 130 is a functional section for inputting operation information, and is, for example, a touch sensor, an operation input key, a button, or the like. The operation input section 130 can be used for a user to input action results, and to input publication instructions of the action log for the log collection device 200, for example.

On the other hand, the information processing terminal 110B, which functions as a log reference apparatus, includes the communications section 120, the operation input section 130, the reference log acquisition section 140, the display processing section 150, the presentation section 160, the schedule adjustment section 170, and the schedule storage section 180.

The communications section 120 and the operation input section 130 can be similarly configured by being provided in the information processing terminal 100A, which functions as the above described log sensor apparatus. The communications section 120, in addition to the operation example described above, transmits reference log acquisition instructions input from the reference log acquisition section 140, for example, to the log collection apparatus 200, and receives a public log, requested by reference log acquisition instructions, from the log collection apparatus 200. Further, the operation input section 130, in addition to the operation example described above, inputs the reference log acquisition instructions to the log collection apparatus 200, and inputs operation information, such as a selection and decision of information presented in the presentation section 160.

The reference log acquisition section 140 acquires the referred public log from the log collection apparatus 200, based on the reference log acquisition instructions. The reference log acquisition section 140 acquires the targeted public log from the log collection apparatus 200, based on the reference log acquisition instructions input from the operation input section 130. The acquired public log is output to the display processing section 150.

The display processing section 150 performs a display process of information which is presented to the user by the presentation section 160. The display processing section 150, for example, performs a display process of the public log acquired by the reference log acquisition section 140, and modifies the information displayed in the presentation section 160 according to the operation information input from the operation input section 130. Further, the display processing section 150 performs a display process for displaying schedule information adjusted by the schedule adjustment section 170 in the presentation section 160.

The presentation section 160 is a functional section which presents to the user information display processed by the display process section 150, and, for example, can be a display device such as a liquid crystal display, an organic EL display, or the like. In this case, the operation input section 130 and the presentation section 160 may be formed in one body using a touch panel or the like.

The schedule adjustment section 170 incorporates the selected public log as a schedule into the schedule information of the user. The schedule adjustment section 170 incorporates the selected public log as a schedule into the schedule information of the user, based on selection information of the public log input from the operation input section 130. In this case, the schedule adjustment section 170 adjusts the incorporation of the schedule from the public log to the schedule information, in accordance with a superimposed state of the schedule and public log already recorded in the schedule information. The schedule information adjusted by the schedule adjustment section 170 is displayed processed by the display processing section 150, and is presented to the user from the presentation section 160.

The schedule storage section 180 is a storage section which stores schedule information of the user of the information processing terminal 100B. A schedule set by the user and a schedule set based on the selected public log are stored as schedule information in the schedule storage section 180. The schedule storage section 180 may be provided in the information processing terminal 100B, such as in the present embodiment, or may be provided in a server or the like connected to the information processing terminal 100B through a network.

(Log Collection Apparatus)

The log collection apparatus 200, as shown in FIG. 4, includes a communications section 210, a log management section 220, and a log storage section 230.

The communications section 210 is an interface which communicates with each of the information processing terminals 100A and 100B through a network. The communications section 210 receives the action log acquired from the information processing terminal 100A, which is a log sensing apparatus, and the public information of the action log. Further, the communications section 210 receives reference log acquisition instructions from the information processing terminal 100B, which is a log reference apparatus, and transmits the public log requested by the reference log acquisition instructions.

The log management section 220 is a functional section which manages the action log stored in the g storage section 230. The log management section 220 stores the action log acquired from the information processing terminal 100A, which is a log sensing apparatus, as a user log for each user. Further, the log management section 220 sets a user log not yet publically open to other people as a public log, based on publication instructions of the action log. In addition, the log management section 220 receives reference log acquisition instructions from the information processing terminal 100B, which is a log reference apparatus, acquires the specified public log, and transmits the public log to the information processing terminal 100B through the communications section 210.

The log storage section 230 is a storage section which stores the action log acquired by the information processing terminal 100. The log storage section 230, as shown in FIG. 4, stores the user log, which is an action log for each user, and the public log publically open to other people. The user log is an action log yet to be publically opened, and becomes a public log by receiving publication instructions from the user. Information meeting a current situation can be presented, in the short-term, to the user in the log storage section 230, by storing an immediate action log of approximately 2-3 months, for example.

Here, as shown in FIG. 5, the action log is represented and managed in the form of 5W1H of [When], [Who], [What], [Where], [Why] and [How]. For example, the start time and the end time of the action are managed as [When], an acted username and those in attendance (participants) are managed as [Who], and what has been done is managed as [What]. In addition, an acted location and distance are managed as [Where], a target and purpose of the action are managed as [Why], and a scheme, correspondence, or the like, for taking this action are managed as [How].

In the information processing system according to the present embodiment, an action log is managed with the above format, and schedule information of the user is managed with a similar form (format). While the action log is information related to the past, and the schedule of schedule information is information related to the future, when a schedule of an elapsed time is implemented, the schedule becomes the action log. Therefore, it is possible to manage both with a similar format, and the action log can be easily incorporated into the schedule information.

<3. Schedule Creation Function Using the Action Log>

Figure 6:
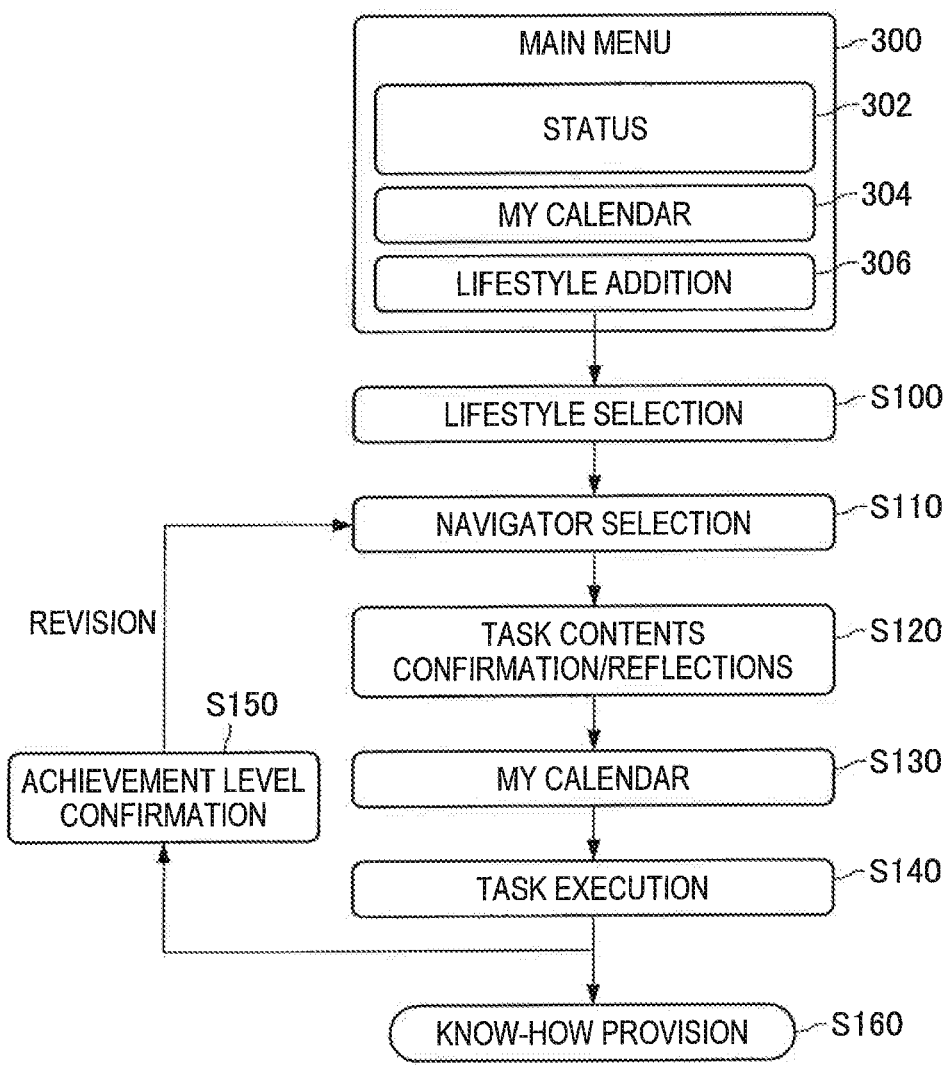
FIG. 6 is a flow chart showing a schedule creation process using an action log by an information processing system according to the present embodiment.
Figure 16:
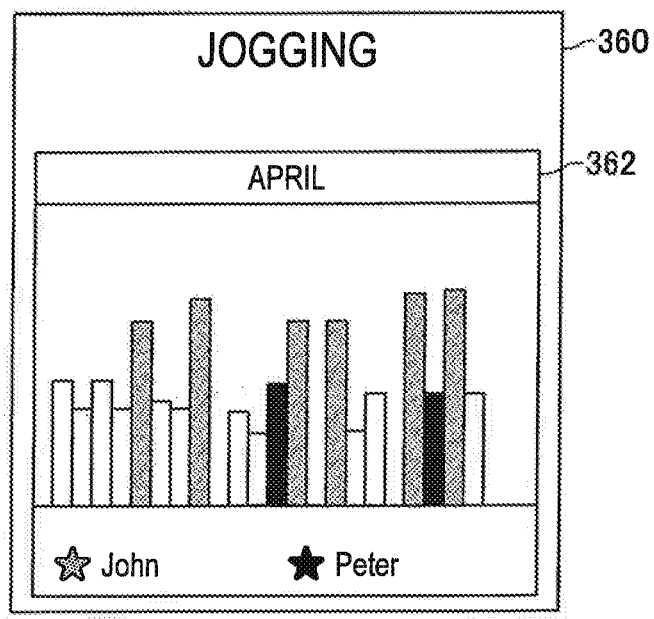
FIG. 16 is an example of a communications screen, and is an explanatory diagram showing a case in which a comparison with a friend is displayed.
Figure 17:
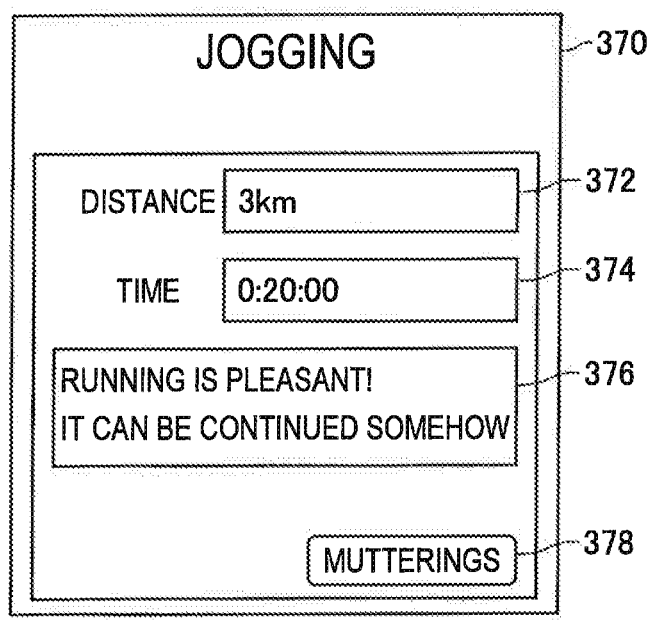
FIG. 17 is an example of a communications screen, and is an explanatory diagram showing a case in which an impression is displayed.
Figure 18:
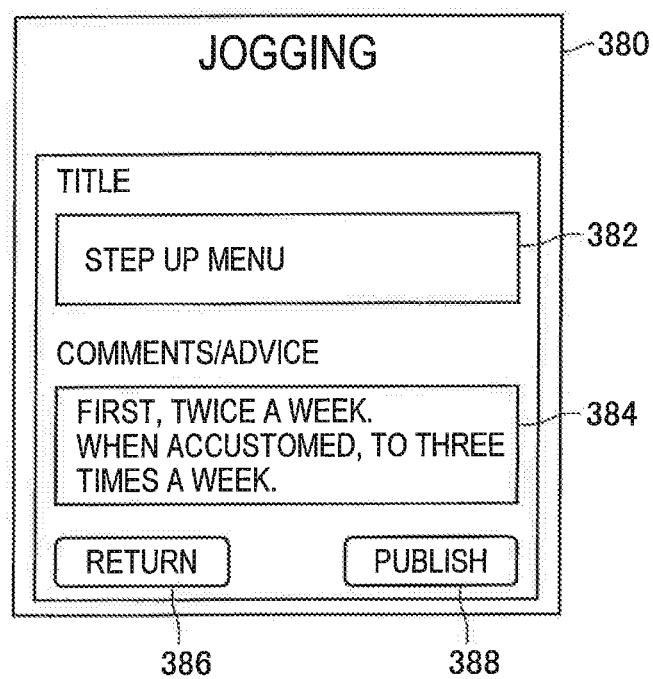
FIG. 18 is an example of a communications screen, and is an explanatory diagram showing a case in which a comment or advice is displayed.

Hereinafter, based on FIGS. 6 to 18, a schedule creation function using an action log by the information processing system according to the present embodiment will be described. FIG. 6 is a flow chart showing a schedule creation process using an action log by the information processing system according to the present embodiment. FIGS. 7 to 15 are explanatory diagrams showing examples of a UI of the information processing terminal 100 during schedule creation using an action log. FIGS. 16 to 18 are explanatory diagrams showing examples of a communication screen. Note that hereinafter an example which records jogging (target action) of the user A in the schedule information as a lifestyle will be described.

[3-1 Schedule Creation Process Using an Action Log by the Information Processing System]

Figure 7:
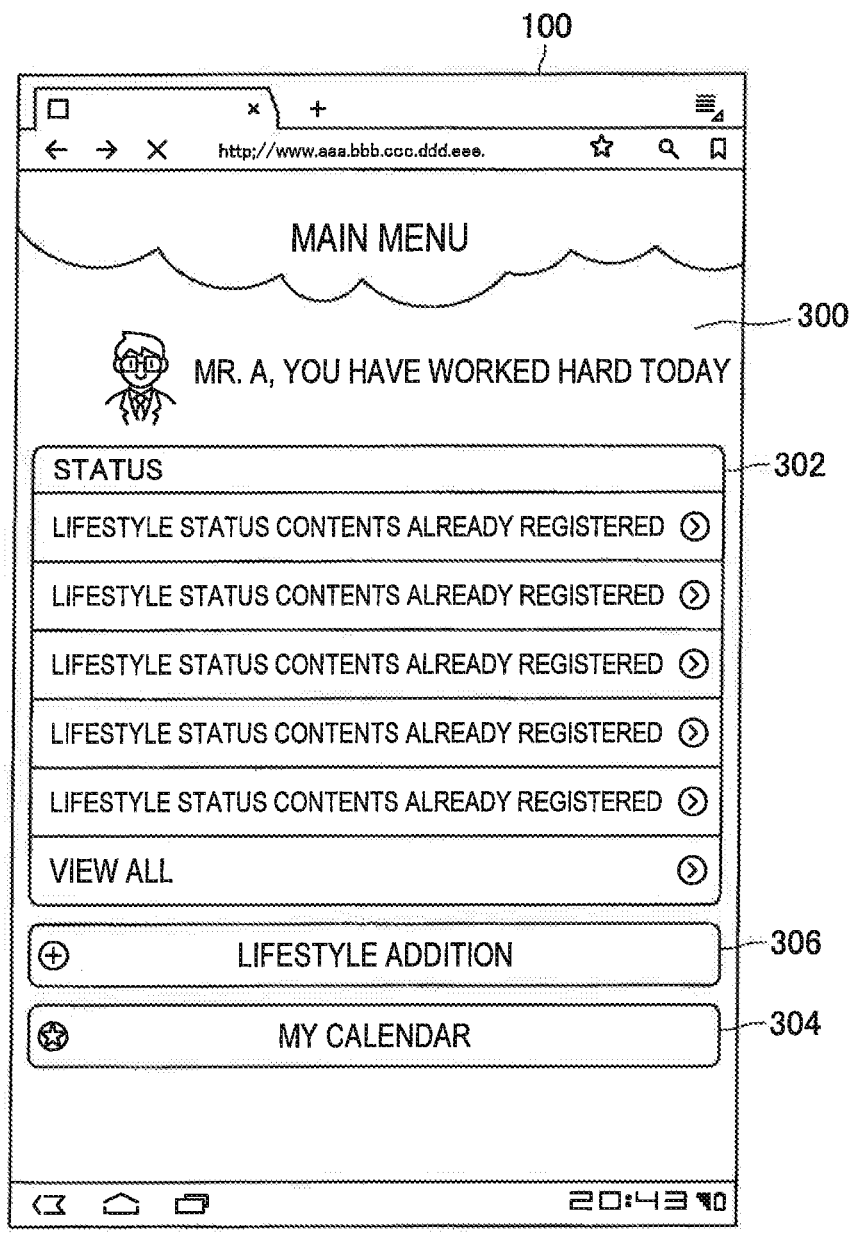
FIG. 7 is an explanatory diagram showing an example of a UI of an information processing terminal during schedule creation using an action log, and shows a main menu.

A main menu 300 can be displayed in the information processing terminal 100 as an initial screen which performs schedule creation using an action log. An example of the main menu 300 is shown in FIG. 7. For example, a status 302, which is condition information of the lifestyle already recorded by the user A, is displayed on the main menu 300. A state of the lifestyle during registration can be referred to by selecting an item. Further, a button 304 [my calendar], which displays schedule information of the user A in calendar form, and a button 306 [lifestyle addition], which starts a process of adding a new lifestyle, are displayed on the main menu 300.

Figure 8:
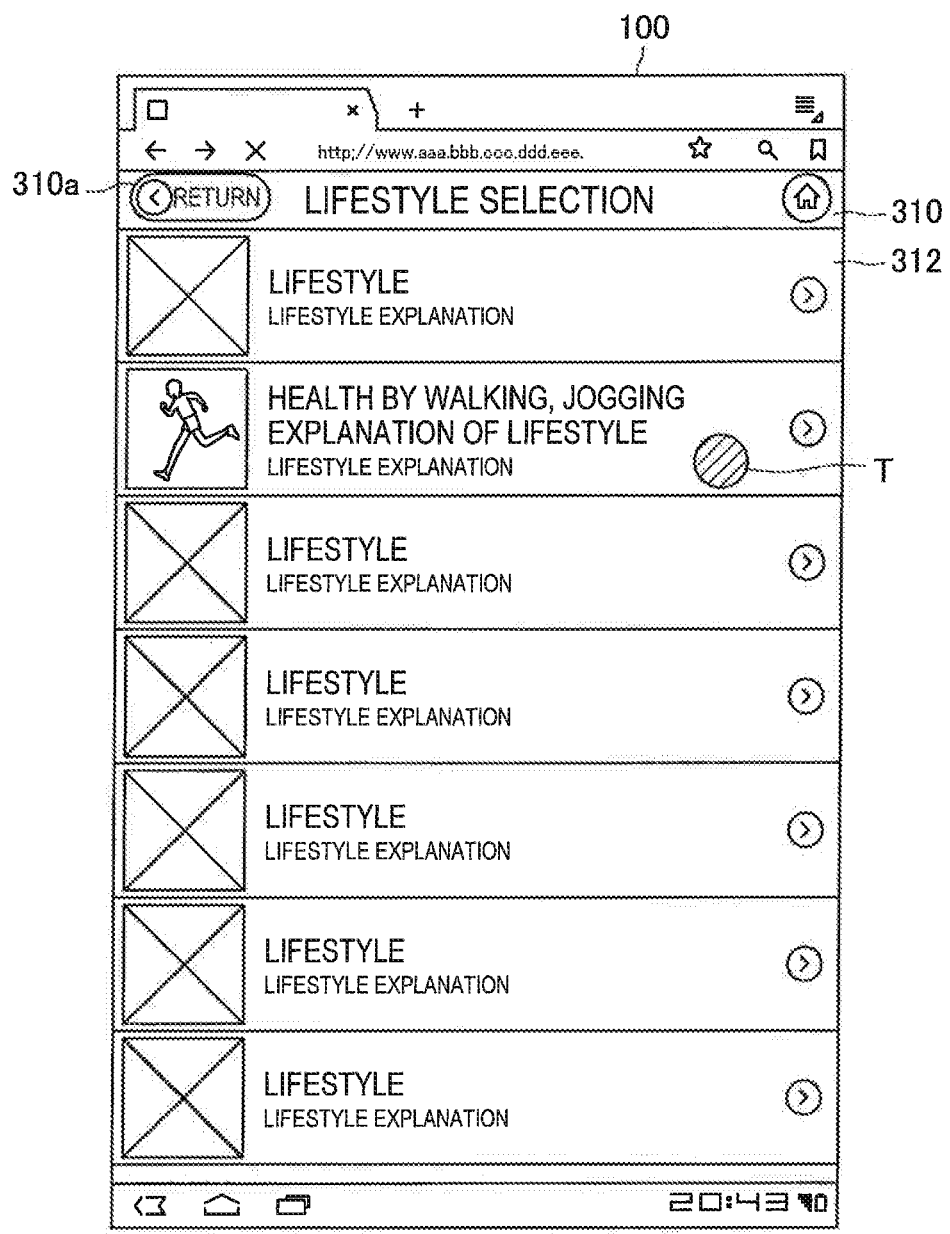
FIG. 8 is an explanatory diagram showing an example of a UI of an information processing terminal during schedule creation using an action log, and shows a lifestyle selection screen.

In the case where a user newly registers a lifestyle, the user pushes the button 306 [lifestyle addition] of the main menu 300 (S100). When the button 306 [lifestyle addition] is pushed, as shown in FIG. 8 for example, a lifestyle selection screen 310, which displays a list of lifestyles 312 that can be added, is displayed in the information processing terminal 100. Note that when a button 310 [return] of the lifestyle selection screen 310 is pushed, it will return to the main menu 300. When a lifestyle 312 added from the lifestyle selection screen, for example the lifestyle [health by walking, jogging], is selected, the action log incorporated into the schedule information then moves to a selection process. Note that in the figures from FIG. 8 onwards, a selection position by a selection operation of the user is shown by the position T.

When a lifestyle is selected by step S100, first a navigator, who is a referring third party, is selected as a process of selecting an action log incorporated into the schedule information (S110). A plurality of action logs of the user are stored and publicly opened in the log collection apparatus 200, and the user can inspect the action logs publically opened. When one lifestyle 312 is selected from the lifestyle selection screen 310, the information processing terminal 100 transmits reference log acquisition instructions, which acquires public logs related to this lifestyle from the reference log acquisition section 140, to the log collection apparatus 200 through the communications section 120. When the log collection apparatus 200 receives reference log acquisition instructions, information related to public logs of this lifestyle are acquired from the log storage section 230 by the log management section 220, and transmitted to the information processing terminal 100 through the communications section 210.

Figure 9:
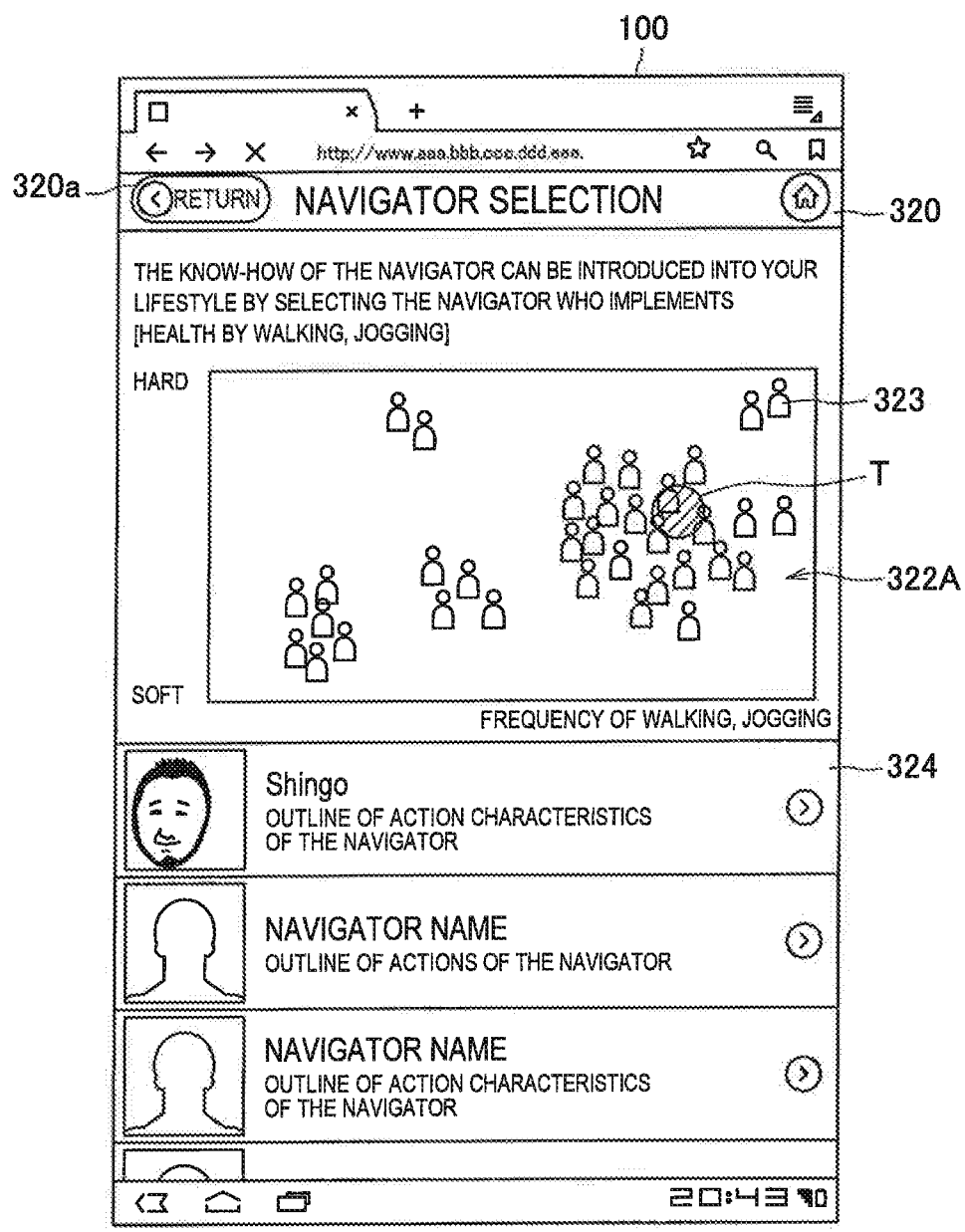
FIG. 9 is an explanatory diagram showing an example of a UI of an information processing terminal during schedule creation using an action log, and shows a navigator selection screen.

Here, information related to the public logs of this lifestyle is information related to the level of the third parties corresponding to the action logs, for example. This information is used so that a user may easily extract an action log to be referenced, based on the user's own level and lifestyle habits, from the plurality of action logs. The selection of a navigator to be referenced is performed by the navigator selection screen 320. As shown in FIG. 9, for example, a navigator list 322A, which maps navigators according to level, is displayed on the navigator selection screen 320. In the case of the lifestyle [walking, jogging] selected in FIG. 8, the navigator list 322A takes the frequency of walking and jogging on the horizontal axis and the level (beginner (soft) to experienced (hard)) of walking and jogging on the vertical axis. Then, it is possible to specify a navigator to be referenced by the user themselves viewing the navigator list 322A, by referring to and mapping each navigator with an icon 323.

When the icon 323 of a level to be referenced is selected on the navigator list 322A, a list of information (navigator information 324) of the navigator corresponding to the icon 323 closest to the selection position T is displayed. A photograph or illustration of this navigator, a name, an outline of action characteristics of the navigator, or the like, is displayed in the navigator information 324. The user can specify the navigator of the action log incorporated into the schedule information, by referring to these contents.

Figure 10:
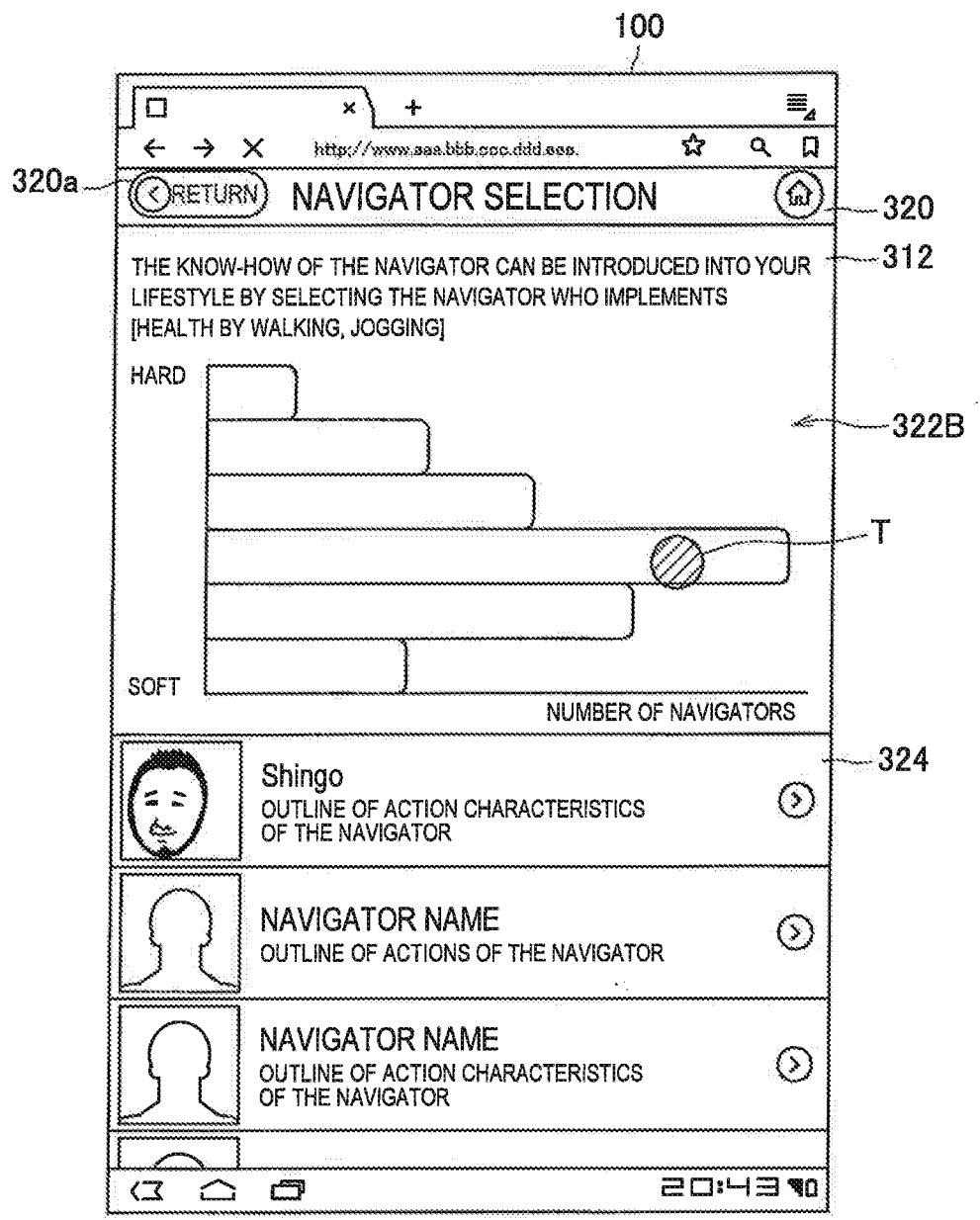
FIG. 10 is an explanatory diagram showing another example of a navigator selection screen.

Note that the navigator list of the navigator selection screen 320 may be a navigator list 322B of a histogram display, which represents the number of people for a level (beginner (soft) to experienced (hard)) of walking and jogging, such as that shown in FIG. 10. In such a navigator list 322B, the level distribution of the navigators can be recognized at a glance. Further, when a button 320a [return] of the navigator selection screen 320 shown in FIG. 9 or FIG. 10 is pushed, it will return to the lifestyle selection screen 310.

Returning to the description of FIG. 6, when the navigator to be referenced by the user is selected, the action log of the selected navigator is confirmed, and a process which incorporates the action log into the schedule information of the user as a schedule is performed (S120). In step S120, first in order to acquire the action log of the selected navigator, the information processing terminal 100 transmits reference log acquisition instructions, which acquire the action log of this navigator from the reference log acquisition section 140, to the log collection apparatus 200 through the communications section 120. When the log collection apparatus 200 receives these reference log acquisition instructions, the log collection apparatus 200 acquires the action log of this navigator from the log storage section 230 by the log management section 220, and transmits the action log to the information processing terminal 100 through the communications section 210.

Figure 11:
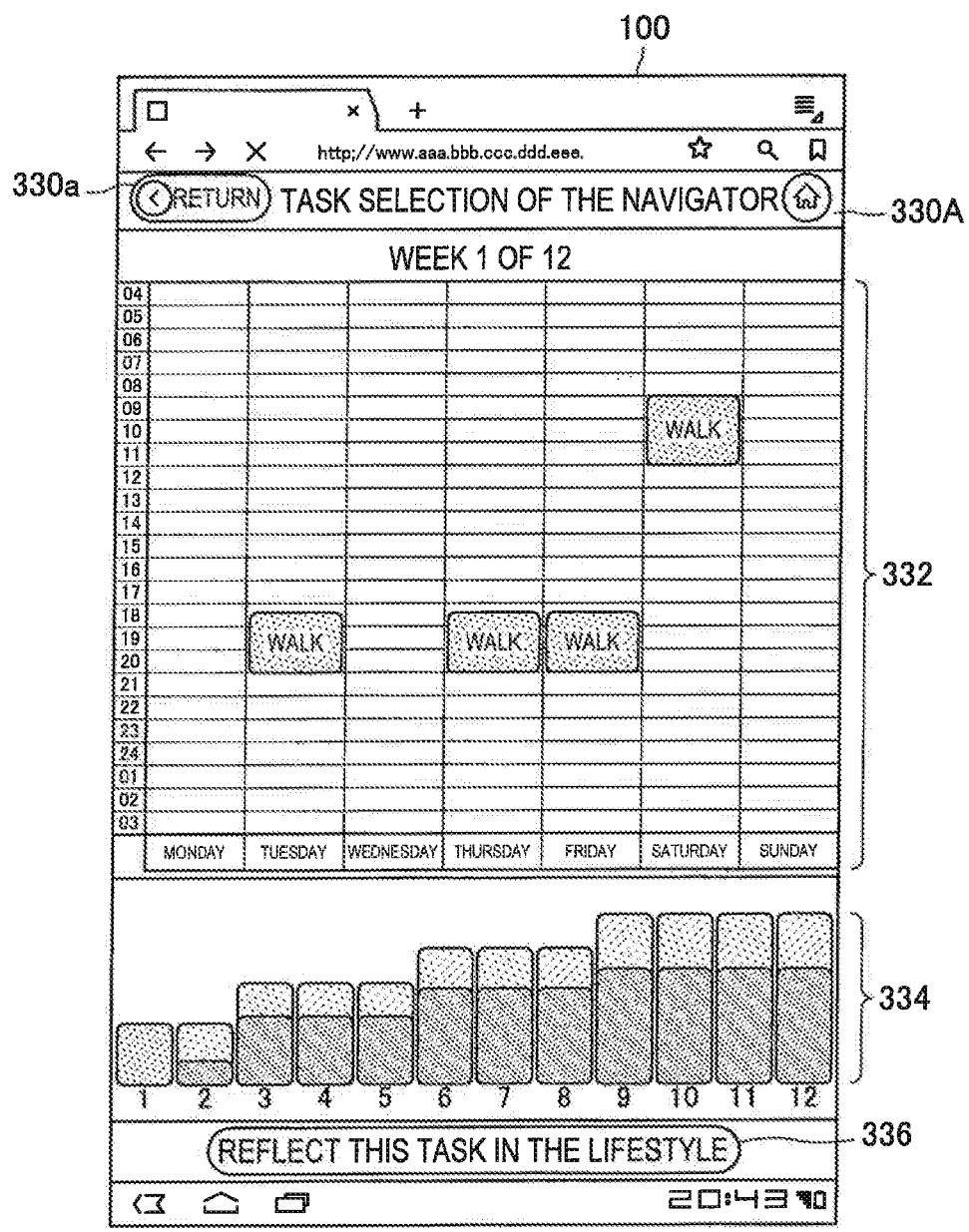
FIG. 11 is an explanatory diagram showing an example of a UI of an information processing terminal during schedule creation using an action log, and shows one part of a task selection screen.

The action log acquired by the log collection apparatus 200 is display processed by the display processing section 150, and is presented to the user from the presentation section 160. In the case of the lifestyle [health by walking, jogging] selected in FIG. 8, for example, the task selection screen 330 (330A), such as that shown in FIG. 11, is displayed. In the task selection screen 330, a weekly task table 332, which represents the action log by a weekly unit or an execution time, and an overall graph, which represents an execution time and the contents of the overall action body tasks by a weekly unit, are both displayed.

Figure 12:
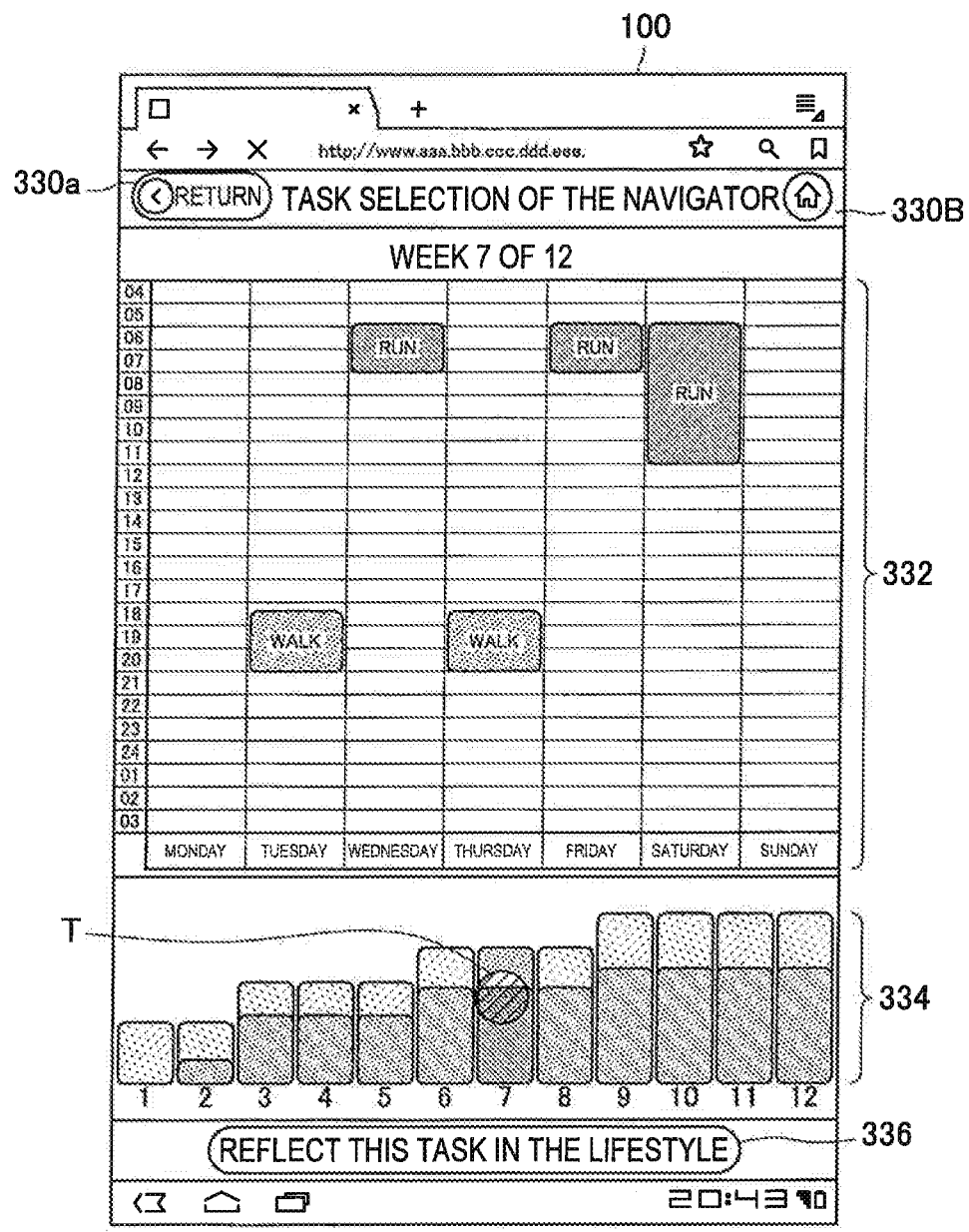
FIG. 12 is an explanatory diagram showing an example of a UI of an information processing terminal during schedule creation using an action log, and shows another part of a task selection screen.

For example, in the task selection screen 330A of FIG. 11, a weekly task table 332 of the first week is displayed from among the action logs of twelve weeks. It is understood from the weekly task table 332 of the first week that only walking is performed. When an item of the overall graph 334 is tapped, the corresponding weekly action log can be displayed in the weekly task table 332. For example, as shown in FIG. 12, when an item of the seventh week from the overall graph 334 is tapped, the weekly task table 332 of the seventh week is displayed, and it can be understood that walking and jogging are performed. Further, since the height of these items correspond to the time from the entire graph 334, the increase in time to perform the task in one week can be understood for the elapsed time from the start of the task.

Figure 13:
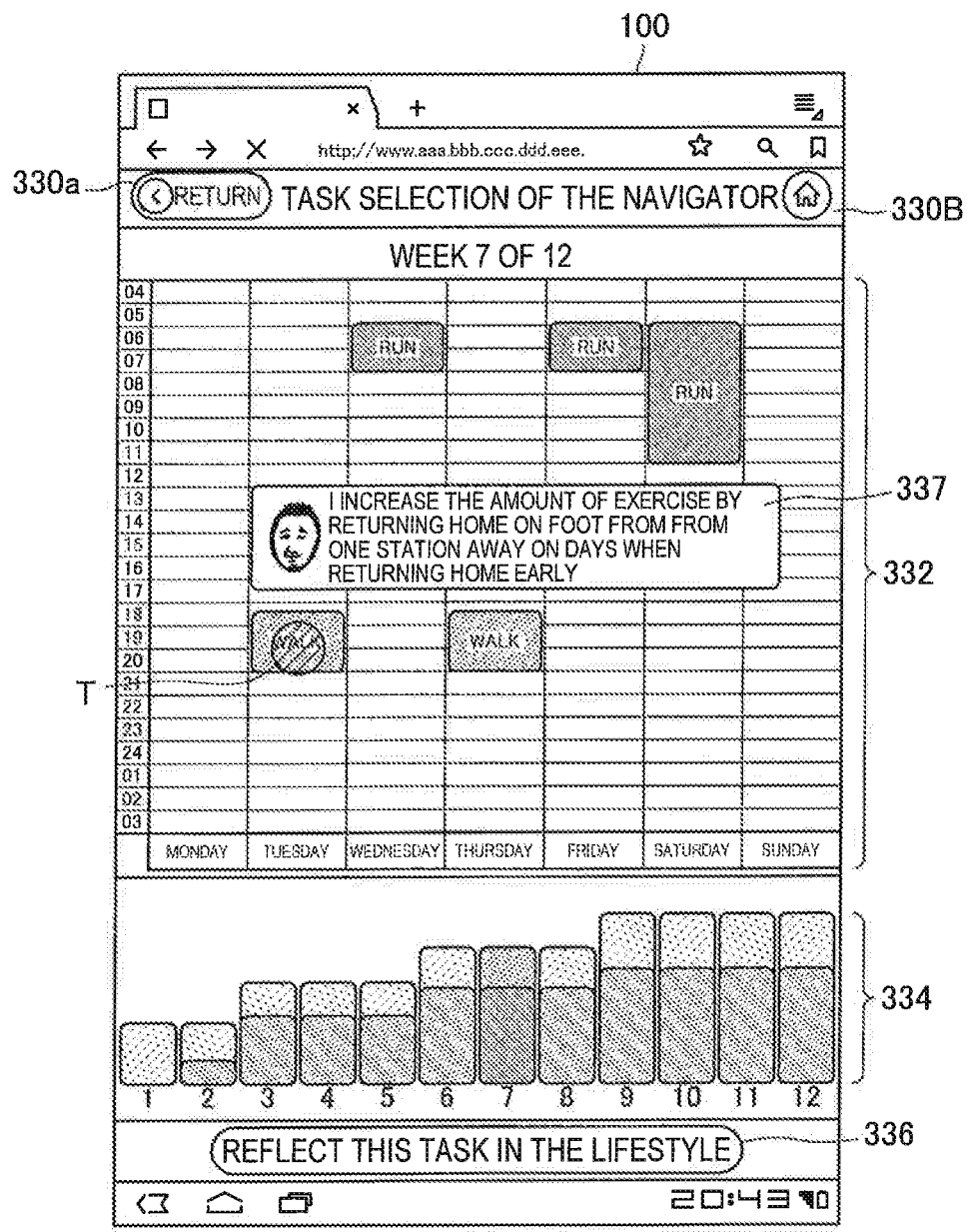
FIG. 13 is an explanatory diagram showing a state in which a comment is displayed on a task selection screen.
Figure 14:
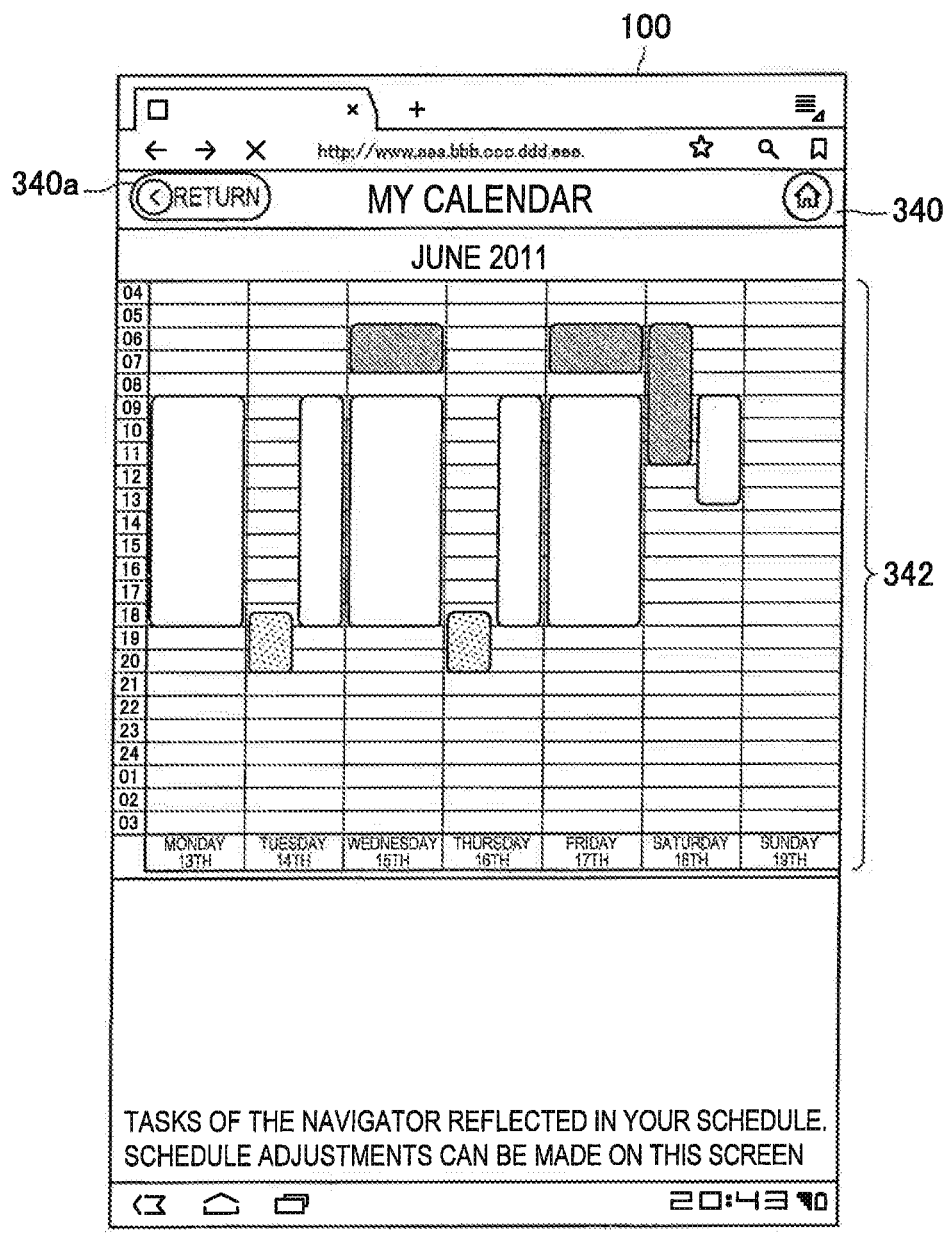
FIG. 14 is an explanatory diagram showing an example of a UI of an information processing terminal during schedule creation using an action log, and shows a calendar screen.
Figure 15:
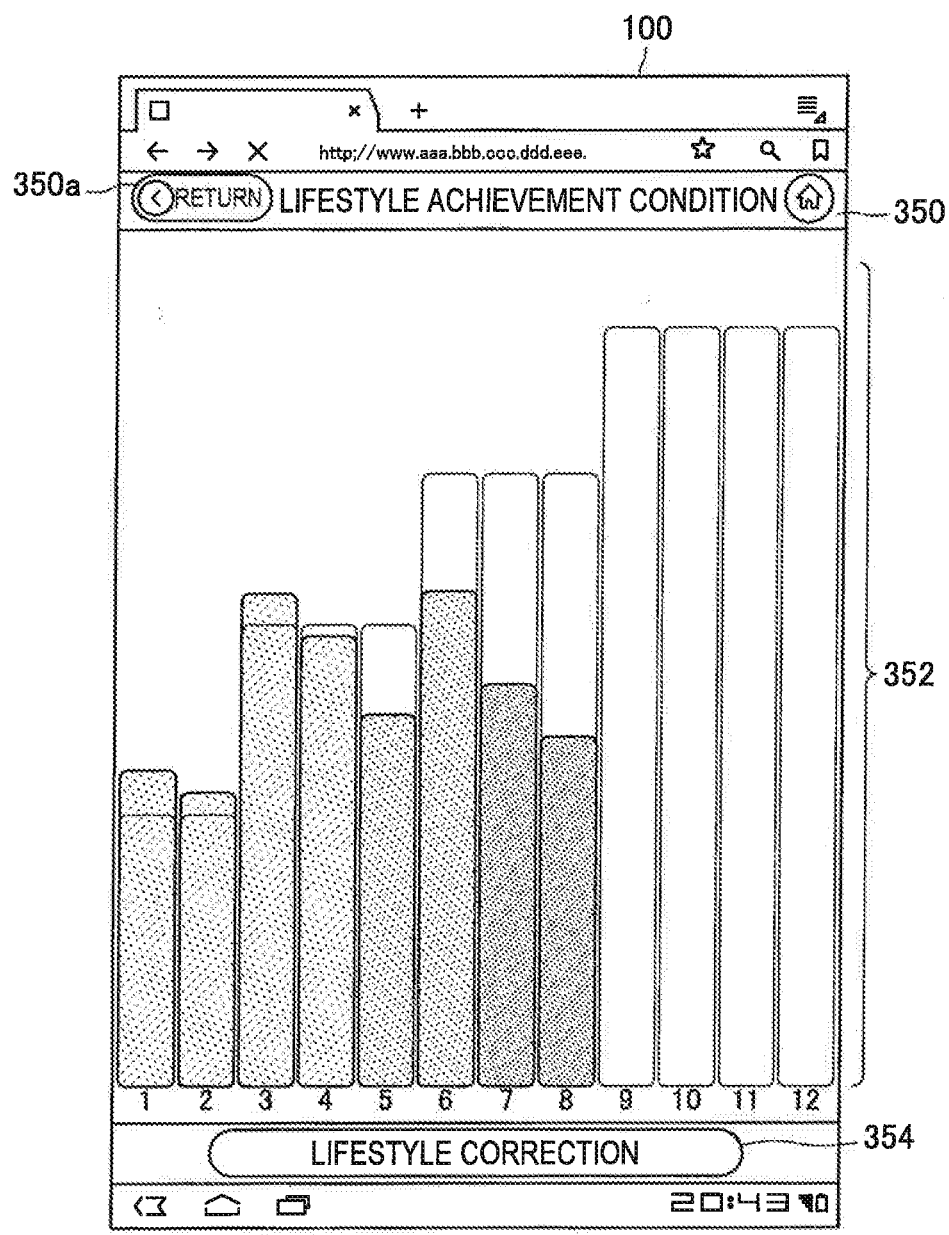
FIG. 15 is an explanatory diagram showing an example of a UI of an information processing terminal during schedule creation using an action log, and shows an achievement condition screen.

In addition, as shown in FIG. 13, when a task of the weekly task table 332 of the task selection screen 330B is selected, a comment 337 for performing this task may be displayed on the task selection screen 330B. This content is an item corresponding to [How] of the action log and the user can refer to a scheme or the like for being able to use a task by the navigator or for achieving the target action. Note that when the button 330a [return] of the task selection screen 330 in FIGS. 11 to 13 is pushed, it will return to the navigator selection screen 320.

In this way, in the case where the action log of the selected navigator is referred to and incorporated into the schedule information of the user themselves as a schedule, a button 336 [reflection] of the task selection screen 330 is pushed. In this way, a reflection process of the action log of the navigator to the schedule information is started by the schedule adjustment section 170. The schedule adjustment section 170 may perform a process which corrects information of the action log of the navigator, for example, for incorporating the action log of the navigator into appropriate schedule information. Since the action log is an actually acted result by the navigator, detailed information for time and distance, for example, is provided. However, this is difficult to incorporate into the schedule information used as the schedule. Accordingly, the schedule adjustment section 170 may easily perform a correction process which rounds the action log, such as integrating into 30 minute units for time, and may easily handle information.

Further, the schedule adjustment section 170 basically applies a start time and an end time of the task, a performance interval, and the like, in the action log of the navigator as a schedule of the schedule information as it is. Therefore, overlapping with the schedule already recorded in the schedule information is expected. In this case, if there is a case which can be applied if there are slight changes in the start time and end times, for example, the schedule adjustment section 170 may incorporate the task of the action log into the schedule information by performing fine adjustments. Further, in the case where there is a large overlap with the schedule already recorded in the schedule information, the schedule adjustment section 170 may recommend re-selection of the navigator, for example, and may present an adjustment plan to the user.

Afterwards, the schedule information, in which the action log of the navigator has been incorporated as a schedule, is process displayed by the display processing section 150, and is presented to the user from the presentation section 160 (S130). The schedule information, in which the action log of the navigator has been incorporated as a schedule, such as that shown in FIG. 14 for example, is displayed on a calendar display screen 340, which displays the schedule information of the user. A schedule already recorded in the schedule information, and a schedule reflecting the action log of the navigator, are displayed in the weekly task table 342 of the calendar screen 340.

The user performs the schedule (task), based on the schedule information, in which the action log of the navigator has been incorporated as the schedule (S140). This performance result may be notified to the user, and an achievement level may be confirmed (S150). For example, on the achievement condition screen 350, such as that shown in FIG. 15, an achievement level graph 352 is displayed, which displays the target week on the horizontal axis and the achievement level on the vertical axis, and the results for the target of each week are shown. In this way, it is possible to notify whether or not the schedule of the action log of the navigator incorporated into the schedule information is surely performed. In this case, the achievement level can be more clearly notified to the user by changing the color of items showing the results, in accordance with the achievement level.

There are cases where a user who has confirmed the achievement condition screen 350 feels a difference of level with that of the schedule of the action log of the selected navigator, and may think that the lifestyle habits are not suitable. Here, the button 354 [lifestyle correction] of the achievement condition screen 350 is pushed, and the navigator of the action log incorporated into the schedule information may be corrected. When the button 354 [lifestyle correction] is pushed, the navigator selection screen 320 is displayed. Then, the action log of the navigator incorporated into the schedule information can be changed by performing the processes from step S110.

Further, the results performed by the user are collected in the log collection apparatus 200 as an action log referred to by other people, based on the schedule information, in which the action log of the navigator has been incorporated as the schedule (S160).

[3.2 Communications Display]

In order to achieve a target behavior, it is important to maintain motivation towards the achievement and to perform the task with enjoyment. Here, in the information processing system, the same target action may be communicated among the users. For example, as shown in FIG. 16, a communications screen 360 may be used, on which a comparison graph 362 is displayed that compares achievement levels among users such as friends.

Further, as shown in FIG. 17, for example, a communications screen 370 may be used, on which a user inputs results for the task and impressions for performing the task. For example, a distance actually jogged column 372, a time column 374 and an impressions input column 376 are provided on the communications screen 370, and result information along with impressions are stored in the log collection apparatus 200, by pushing a contribution button 378. Feelings of how the task is performed can be transmitted to a third party by displaying comments 337 of the navigator, which display these impressions on the task selection screen 330 of FIG. 13, for example.

In addition, as shown in FIG. 18, for example, when the user achieves the target action, a communications screen may be used which inputs comments or advice for using successful experiences of the user themselves. For example, a column which inputs a title representing contents of the successful experiences 382, and comments or advice 384, are provided on the communications screen 380. The communications screen 380 can be used as a screen which performs publication instructions for publically opening the action log of the user themselves, for example, and in the case where the action log is not publically opened, the contents of publication instructions of the action log can be decided by pushing the button 386 [return], and in the case where the action log is publicly opened, the contents of the publication instructions of the action log can be decided by pushing the button 388 [public].

<4. Hardware Configuration Example>

Figure 19:
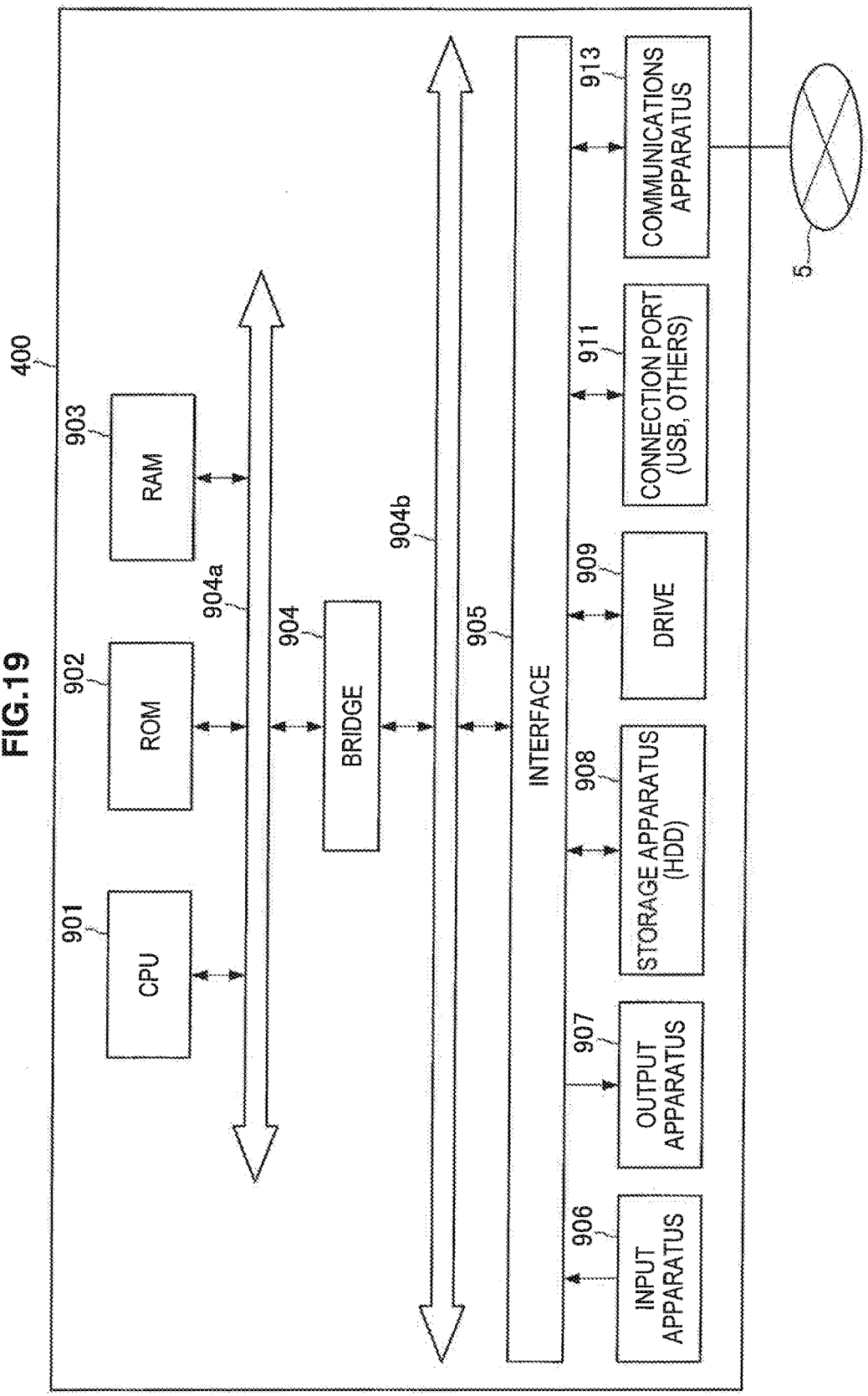
FIG. 19 is a hardware block diagram showing a hardware configuration example of an information processing terminal according to the present embodiment.

The processes by the information processing terminal 100 according to the present embodiment can be performed with hardware, or can be performed with software. In this case, the information processing terminal 100 can be configured such as shown in FIG. 19. Hereinafter, a hardware configuration example of the information processing terminal according to the present embodiment will be described, based on FIG. 19.

The information processing terminal 100 according to the present embodiment, as described above, can be implemented from a processing apparatus such as a computer. The information processing terminal 100, as shown in FIG. 19, includes a CPU (Central Processing Unit) 901, a ROM (Read Only Memory) 902, a RAM (Random Access Memory) 903, and a host bus 904a. Further, the information processing terminal 100 includes a bridge 904, an external bus 904b, an interface 905, an input apparatus 906, an output apparatus 907, a storage apparatus (HDD) 908, a connection port 911, and a communications apparatus 913.

The CPU 901 functions as an arithmetic processing apparatus and a control apparatus, and controls all the operations within the information processing terminal 100 according to various programs. Further, the CPU 901 may be a microprocessor. The ROM 902 stores such things as programs used by the CPU 901 and arithmetic parameters. The RAM 903 temporarily stores such things as programs used for the execution of the CPU 901, and parameters arbitrary modified for these executions. These are mutually connected by the host bus 904a composed of a CPU bus.

The host bus 904a is connected to the external bus 904b, such as a PCI (Peripheral Component Interconnect/Interface) bus, through the bridge 904. Note that it is not necessary to separately configure the host bus 904a, bridge 904, and external bus 904b, and these functions may be implemented on one bus.

The input apparatus 906 generates an input signal based on the input from a user and an input mechanism for the user to input information, such as a mouse, keyboard, touch panel, button, microphone, switch or the like, and includes an input control circuit which outputs to the CPU 901. The output apparatus 907, for example, includes a display device, such as a liquid crystal display (LCD) device, an OLED (Organic Light Emitting Diode) device or a lamp, and a voice output apparatus, such as a speaker.

The storage apparatus 908 is an example of a storage section of the information processing terminal 100, and is an apparatus for data storage. The storage apparatus 908 may include a storage medium, a recording apparatus which records data to the storage medium, and an erasure apparatus which erases data recorded in a reading apparatus reading data from the storage medium, and the storage medium. The storage apparatus 908, for example, is configured by a HDD (Hard Disk Drive). This storage apparatus 908 drives a hard disk, and stores programs executed by the CPU 901 and various data.

The drive 909 is a reader/writer for the storage medium, and is built into the information processing terminal 100 or is externally attached. The drive 909 reads out information recorded in a removable recording medium, such as a mounted magnetic disk, an optical disk, a magneto-optical disk, or a semiconductor memory, and outputs the information to the RAM 903.

The connection port 911 is an interface connected to an external apparatus, and is a connection port with the external apparatus that can transmit data by USB (Universal Serial Bus) or the like, for example. Further, the communications apparatus 913, for example, is a communications interface configured by a communications device or the like for connecting to a communications network 5. Further, the communications apparatus 913 may be a communications apparatus for wireless LAN (Local Area Network), a communications apparatus for a wireless USB, or a wired communications apparatus which communicates by cables. Note that the log collection apparatus 200 may also have the hardware configuration shown in FIG. 19.

It should be understood by those skilled in the art that various modifications, combinations, sub-combinations and alterations may occur depending on design requirements and other factors insofar as they are within the scope of the appended claims or the equivalents thereof.

For example, in the above embodiments, while the schedule adjustment section 170 is provided in the information processing terminal 100, the present disclosure is not limited to such an example. For example, the processes of the schedule adjustment section 170 may be executed on the log collection apparatus 200 side.

Further, in the above embodiments, while the schedule information of the user is stored in the schedule storage section 180 of the information processing terminal 100 used by this user, the present disclosure is not limited to such an example, and the schedule information of the user may be stored in an external schedule management server, for example.

Additionally, the following configurations are also within the technical scope of the present disclosure.
(1) An information processing apparatus including:
a presentation section which presents an action log that is an action result of a third party; and
a schedule adjustment section which incorporates the action log selected from the presented action log by a user as a schedule of schedule information of the user.
(2) The information processing apparatus according to (1), wherein the action log and the schedule information are of a common format.
(3) The information processing apparatus according to (1) or (2),
wherein the schedule information includes time information.
(4) The information processing apparatus according to any one of (1) to (3),
wherein the schedule adjustment section incorporates the action log into the schedule information so that the schedule of the user already incorporated into the schedule information does not overlap with the schedule of the selected action log.
(5) The information processing apparatus according to (4), wherein the schedule adjustment section proposes a modification of the action log incorporated into the schedule information when the schedule of the user already incorporated into the schedule information overlaps with the schedule of the selected action log.
(6) The information processing apparatus according to any one of (1) to (5),
wherein the schedule adjustment section corrects information of the action log by rounding the information to a prescribed level.
(7) The information processing apparatus according to any one of (1) (6), further including:
a display processing section which performs a display process of information presented to the presentation section; and
wherein the display processing section classifies the action log based on information related to a level of the third party corresponding to the action log, and presents the action log to the presentation section.

The present disclosure contains subject matter related to that disclosed in Japanese Priority Patent Application JP 2011-225942 filed in the Japan Patent Office on Oct. 13, 2011, the entire content of which is hereby incorporated by reference.

What is claimed is:

1. An information processing apparatus comprising:
at least one processor configured to
generate presentation information to present a plurality of selectable action logs based on lifestyle information, each selectable action log corresponding to activity performed by one or more of a plurality of third parties, wherein the presentation information includes
a display process that maps each third party of the one or more third parties corresponding to each selectable action log presented in a navigator selection screen by a classified level of activity of the third party on a first axis and by a frequency of activity of the third party on a second axis,
a scheme for achieving the activity corresponding to each selectable action log, and
feelings of at least one of the plurality of third parties when achieving the activity corresponding to at least one selectable action log;
receive an action log acquisition instruction by a selection by a user of a selected action log corresponding to a selected third party navigator from among the mapped one or more third parties presented in the navigator selection screen; and
incorporate a schedule into schedule information of the user based on the received action log acquisition instruction,
wherein a comparison graph is displayed that compares achievement levels between the user and another user.

2. The information processing apparatus according to claim 1, wherein the plurality of selectable action logs and the schedule information are of a common format.

3. The information processing apparatus according to claim 1, wherein the schedule information includes time information.

4. The information processing apparatus according to claim 1, wherein the at least one processor adjusts the schedule of the user upon selection of the selected action log by incorporating the selected action log into the schedule information to avoid schedule conflicts in the schedule of the user already incorporated into the schedule of the user.

5. The information processing apparatus according to claim 4, wherein the at least one processor is further configured to propose a modification of the selected action log incorporated into the schedule information when the schedule of the user already incorporated into the schedule information conflicts with the schedule of the user.

6. An information processing method, implemented via at least one processor, the method comprising:
generating presentation information to present a plurality of selectable action logs based on lifestyle information, each selectable action log corresponding to activity performed by one or more of a plurality of third parties, wherein the presentation information includes
a display process that maps each third party of the one or more third parties corresponding to each selectable action log presented in a navigator selection screen by a classified level of activity of the third party on a first axis and by a frequency of activity of the third party on a second axis,
a scheme for achieving the activity corresponding to each selectable action log, and
feelings of at least one of the plurality of third parties when achieving the activity corresponding to at least one selectable action log;
receiving an action log acquisition instruction by a selection by a user of a selected action log corresponding to a selected third party navigator from among the mapped one or more third parties presented in the navigator selection screen; and
incorporating a schedule into schedule information of the user based on the received action log acquisition instruction,
wherein a comparison graph is displayed that compares achievement levels between the user and another user.

7. A non-transitory computer-readable medium having embodied thereon a computer program, which when executed by a processor of a computer causes the processor to execute a method, the method comprising:
generating presentation information to present a plurality of selectable action logs based on lifestyle information, each selectable action log corresponding to activity performed by one or more of a plurality of third parties, wherein the presentation information includes
a display process that maps each third party of the one or more third parties corresponding to each selectable action log presented in a navigator selection screen by a classified level of activity of the third party on a first axis and by a frequency of activity of the third party on a second axis,
a scheme for achieving the activity corresponding to each selectable action log, and
feelings of at least one of the plurality of third parties when achieving the activity corresponding to at least one selectable action log;
receiving an action log acquisition instruction by a selection by a user of a selected action log corresponding to a selected third party navigator from among the mapped one or more third parties presented in the navigator selection screen; and
incorporating a schedule into schedule information of the user based on the received action log acquisition instruction,
wherein a comparison graph is displayed that compares achievement levels between the user and another user.

8. The information processing apparatus according to claim 1, wherein data of the selected action log is adjusted prior to incorporation into the schedule information of the user.

9. The information processing apparatus according to claim 1, wherein the schedule of the user is adjusted in order to achieve a target action based on the selected action log.

10. The information processing apparatus according to claim 9, wherein each third party of the plurality of third parties is a person who has successfully achieved the same target action.

11. The information processing apparatus according to claim 1, wherein an action result of the selected action log is registered in the schedule information of the user.

12. The information processing apparatus according to claim 1, wherein the selected action log corresponds to preference information of the user.

13. The information processing apparatus according to claim 1, wherein the schedule is further incorporated into the schedule information of the user with the frequency of activity of the selected action log.

14. The information processing method according to claim 6, wherein the schedule is further incorporated into the schedule information of the user with the frequency of activity of the selected action log.

15. The non-transitory computer-readable medium of claim 7, wherein the schedule is further incorporated into the schedule information of the user with the frequency of activity of the selected action log.

16. The information processing apparatus according to claim 1, wherein the presentation information further includes a histogram display representing a number of the plurality of selectable action logs classified into each level of activity.

17. The information processing method according to claim 6, wherein the presentation information further includes a histogram display representing a number of the plurality of selectable action logs classified into each level of activity.

18. The non-transitory computer-readable medium of claim 7, wherein the presentation information further includes a histogram display representing a number of the plurality of selectable action logs classified into each level of activity.

* * * * *